July 11, 1950

E. G. MANGELS 2,514,776

CAR TRUCK STABILIZER

Filed May 8, 1946

INVENTOR.
Erwin G. Mangels
BY
Evans & McCoy
ATTORNEYS

July 11, 1950  E. G. MANGELS  2,514,776
CAR TRUCK STABILIZER

Filed May 8, 1946  3 Sheets-Sheet 3

INVENTOR.
Erwin G. Mangels
BY
Evans + McCoy
ATTORNEYS

Patented July 11, 1950

2,514,776

UNITED STATES PATENT OFFICE 2,514,776

CAR TRUCK STABILIZER

Erwin G. Mangels, Davenport, Iowa

Application May 8, 1946, Serial No. 668,162

8 Claims. (Cl. 105—197)

This invention relates to improvements in railway car trucks and in particular to an improved snubbing or stabilizing device for dampening the action of bolster springs.

Many types of friction snubbers are known, most of which are subject to a common objection, namely that in order to inspect or repair the friction snubber mechanism, it is necessary to remove the bolster springs and disassemble the side frames and the bolster. It is therefore a primary object of the present invention to provide a friction snubber which may be installed after the bolster, springs and side frames have been assembled. The present snubber may also be inspected and removed for repair without disassociation of the bolster and side frame. With this snubber, inspection and maintenance may be accomplished while the freight car is standing in the yard by the use of simple tools, it not being necessary to send the car to the repair shop nor to use heavy or complicated tools.

It is a further object of the present invention to provide a friction snubber in which the breaking of a part of the mechanism during service cannot harm the bolster or the side frame and would merely decrease the effectiveness of the snubber.

Another object is to provide a friction snubber which will dampen vibrations and oscillations or other movement of the side frame with respect to the bolster in both longitudinal and transverse directions.

A further object is to provide a friction snubber which will serve to dampen the action of the bolster springs in which the dampening effect is constant regardless of the amount of compression of the bolster springs or the position of the bolster within the side frame.

Another object is to provide a friction snubber which is simple in design and construction and which has a relatively few number of parts which may be readily installed, inspected, maintained and repaired.

Other objects of the invention will appear more clearly from the following description. In the drawings forming a part of this specification:

Figures 1, 2:
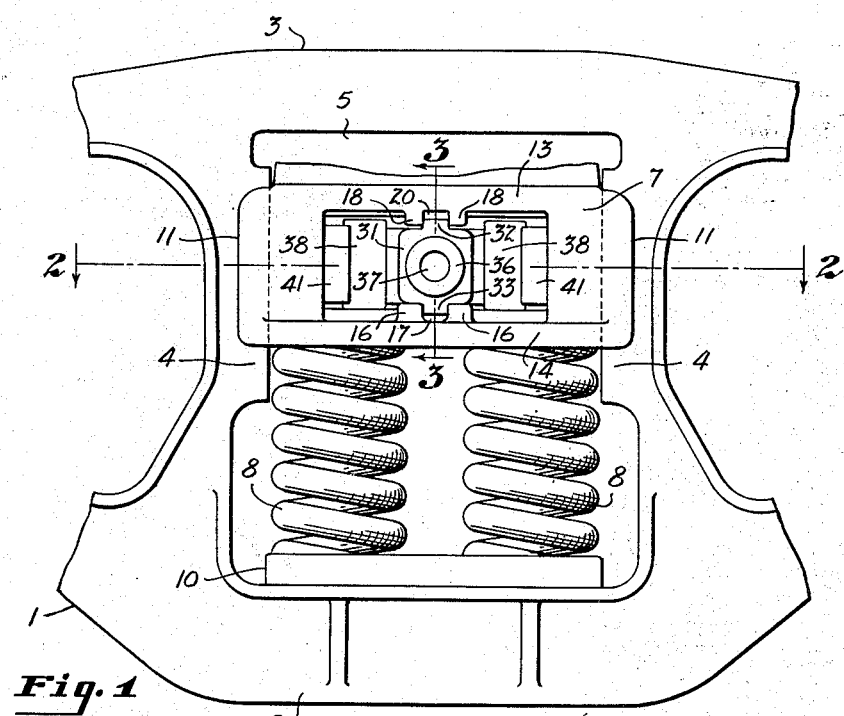
Figure 1 is an elevational view of a portion of a side frame having a bolster associated therewith and a snubbing mechanism embodying the present invention.
Fig. 2 is an enlarged fragmentary sectional view, taken substantially on the line 2—2 of Fig. 1; illustrating the operation of a snubbing device of the present invention.
Figure 3:
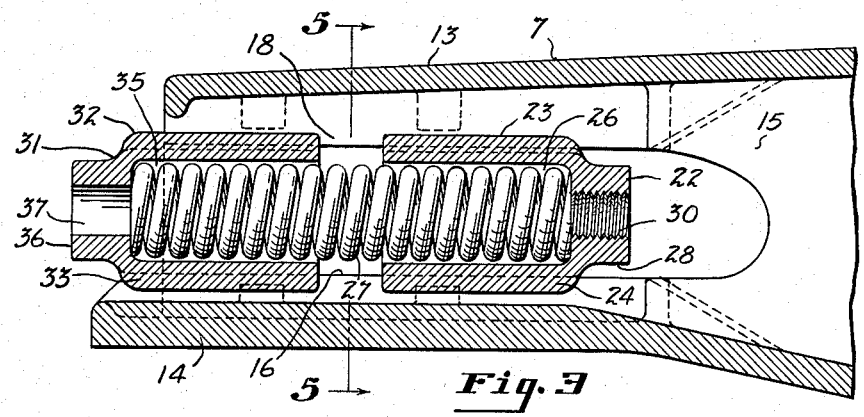
Fig. 3 is an enlarged sectional view showing the interior of the end portion of the bolster, taken substantially on the line 3—3 of Fig. 1.

A truck embodying the present invention comprises a side frame 1 of the usual or customary design having a tension member 2 and a compression member 3. Intermediate the tension and compression members and approximately centrally disposed are side frame columns 4 which define a bolster opening 5. These columns are provided with bearing surfaces 6 which may be integral or which may be formed by replaceable wearplates welded or otherwise fastened to the columns 4. Received within the bolster opening 5 is the end of a suitable standard form of bolster 7 which is resiliently mounted on springs 8. The springs 8 may comprise the conventional compression coil springs or any suitable spring group and are supported at their lower end on a spring seat 10 formed in the tension member 2 of the side frame.

Laterally extending from the ends of the bolster 7 are portions which interfit with portions of the bolster columns 4 to limit the movement of the bolster with respect to the side frame and to prevent disassociation of the bolster and side frame. During operation of the truck, while the bolster moves due to its resilient support on the side frame, these interfitting portions serve to guide the movement of the bolster. As may be seen in Fig. 2, the interfitting portions comprise lugs 11 which extend laterally from the bolster at the outboard and inboard extremities of the side frame columns 4 at slightly spaced intervals.

The bolster 7 which bears the weight of the car body and extends transversely of the car between the side frames may comprise at its end portions a hollow box in cross section having side walls 12, a top wall 13 and a bottom wall 14. It is customary to provide an internal central reinforcing web such as indicated at 15 in Fig. 2. To accommodate the friction snubbing mechanism of the present invention, the web 15 has been shortened so that it does not extend to the end of the bolster.

To serve as a guide for the friction snubbing mechanism and to aid in holding the same in its operative position, the top wall 13 and bottom wall 14 of the bolster 7 may be provided with portions which interfit with portions of the snubbing mechanism. For example, the bottom wall 14 of the bolster may be provided with a pair of spaced upstanding ribs 16 which provide a channel 17 therebetween, in which a portion of the snubbing mechanism may be received. Similarly the top wall 13 of the bolster may be provided with depending ribs 18 spaced to provide a channel 20 therebetween which serves to receive and guide a portion of the friction snubbing mechanism. The ribs 16 on the bottom wall 14 of the bolster and the ribs 18 of the top wall 13 of the bolster increase the cross sectional strength of the bolster sufficiently to offset the fact that the central reinforcing web 15 does not extend to the end of the bolster.

In the lateral end portions of the bolster, the side walls 12 are provided with apertures 21 between the guide lugs 11 which extend outwardly from the side walls 12 at the inboard and outboard extremities of the side frame columns 4. These apertures are disposed adjacent the bearing surfaces 6 of the side frame columns 4 and permit the bearing of the frictional surfaces of the snubbing mechanism to contact the bearing surfaces of the side frame columns.

The snubbing mechanism embodying the present invention in the form illustrated in Figs. 1 through 5 comprises a pair of opposed spring blocks which are operated by and support therebetween a suitable resilient means. Each of these spring blocks has diverging wedge surfaces which are directed toward the wedge surfaces of the other spring block and also toward the bearing surfaces of the side frame columns. Suitable wedge blocks having diverging wedge surfaces are carried by the bolster and are located between the spring blocks and the bearing surfaces of the side frame columns. The diverging wedge surfaces of the wedge blocks are disposed adjacent and in juxtaposition with a wedge surface of each of the spring blocks so that movement of the spring blocks toward or away from each other will cause movement of the wedge blocks toward and away from the side frame columns. The wedge blocks actuate frictional surfaces which extend through the apertures in the side walls of the bolster into frictional engagement with the bearing surfaces of the side frame columns. This may be accomplished by use of suitable friction blocks actuated by the wedge blocks.

Viewing the drawings, it will be seen that the snubbing mechanism comprises an inner spring block 22 which is insertable into the open end of the bolster. This spring block is provided with an upper rib or key 23 adapted to slide in channel 20 between the ribs 18 of the top wall 13 of the bolster end and a lower rib or key 24 that is received in the channel 17 between the ribs 16 of the bottom wall 14 of the bolster. The side walls comprise wedge surfaces 25 which diverge outwardly toward the end of the bolster and are directed one toward each of the bearing surfaces. The spring block 22 is provided with a socket 26 adapted to receive one end of a suitable resilient means such as the helical compression spring 27. The inner end of the spring block 22 adjacent the socket 26 comprises a boss 28 which is bored and threaded as indicated at 30 for a purpose to be described. The threaded bore is of a smaller diameter than the internal diameter of the spring.

Disposed outwardly of the inner spring block 22 and in opposed relationship thereto is an outer spring block 31 which is also provided with an upper rib or key 32 adapted to be received in the channel 20 between the ribs 18 at the top wall of the bolster and a lower rib or key 33 adapted to be received in the channel 17 between the ribs 16 of the bottom wall of the bolster. The outer spring block 31 is also provided with wedge surfaces 34 which diverge toward the inner spring block 22 and toward each of the bearing surfaces of the side frame columns. Spring block 31 has a socket 35 adapted to receive an end of the compression spring 27. Adjacent the socket 35 a boss 36 is provided having a bore 37 which bore is of a slightly larger diameter than the threaded bore 30 at the inner spring block 22 and is not threaded.

On each side of the spring blocks 22 and 31 between the spring blocks and the side frame columns are suitable wedge blocks 38. Each wedge block 38 has internal wedge surfaces 40 which diverge toward the spring blocks and are adapted to be disposed in cooperative relationship with a wedge surface 25 of the inner spring block 22 and a wedge surface 34 on the outer spring block 31. The wedge blocks 38 are supported by bottom wall 14 of the bolster and act as followers to the wedge surfaces 25 and 34 of the spring blocks 22 and 31.

Positioned between the wedge blocks 38 and side frame columns 4 are suitable friction blocks 41. The friction blocks 41 are insertable through the open ends of the bolster and project through the apertures 21 in the side walls 12 of the bolster. Each of the friction blocks 41 is provided with a friction surface 42 adapted to be disposed adjacent to and in frictional engagement with the bearing surface 6 of the adjacent side frame column 4. The sides of the friction blocks opposite their friction surfaces 42 are adapted to be in contact with the wedge blocks 38 to prevent misalignment of the wedge blocks 38 and the friction blocks 41, the blocks 38 and 41 at each side forming a laterally movable friction unit that is pressed toward a bearing face 6.

Each of the friction blocks is provided with an inner flange 43 and an outer flange 44 which are spaced to receive and embrace the ends of the wedge blocks. The flanges 43 and 44 will also prevent too great an insertion of the friction blocks 41 into the apertures 21 of the bolster side walls 12.

It will be apparent that as the spring 27 forces the spring blocks 22 and 31 apart, the separation of the wedge surfaces 25 and 34 of the spring blocks 22 and 31 will cause the wedge surfaces 40 of the wedge blocks 38 to move the wedge blocks apart in the direction of the side frame columns. Movement of the wedge blocks 38 also causes the friction blocks 41 to move in the direction of the side frame columns and bring the friction surfaces 42 of the friction blocks into frictional engagement with the bearing surfaces 6 of the side frame columns. The frictional engagement between the friction blocks and the side frame columns serves to dampen or stabilize the vertical movement of the bolster with respect to the side frame resulting from the action of the bolster springs 8 which resiliently support the bolster on the side frames.

The ease of insertion and removal of the snubbing mechanism embodying the present invention is an important advantage of this mechanism. Removal of the snubbing mechanism may be accomplished in the following manner:

An installation bolt 45 having a threaded portion 46 may be inserted through the bore 37 of the outer spring block 31, through the bore of the stabilizer spring 27, and be received for threaded engagement with the threaded bore 30 of the inner spring block 22. As the bolt is tightened, it will draw the spring blocks 22 and 31 together thus compressing the spring 27. When the spring 27 is substantially compressed, the spring blocks 22 and 31 will be drawn together until they are approximately in contact with each other and in this position the wedge blocks 38 may be moved sufficiently close together that they will clear the outer flanges 44 of the friction blocks and by pulling the bolt 45 from the bolster the spring blocks and wedge blocks may be removed through the open end of the bolster as is illustrated in Fig. 4.

It will be noted that when the spring blocks and wedge blocks are removed from the bolster, the friction blocks may be moved so that their friction surfaces are out of engagement with the bearing surfaces of the side frame columns and further movement of the friction blocks will permit them to be drawn into the interior of the bolster through the apertures 21 so that they may be removed through the open end of the bolster.

Installation of the snubbing mechanism may be accomplished in the reverse manner. The proper installation of the wedge blocks is facilitated by the inner flanges 43 on the friction blocks which do not permit the wedge blocks to go beyond their aligned position with the friction blocks. After the mechanism is installed the installation bolt 45 may be removed which permits the spring 27 to expand and actuate the friction blocks so that their friction surfaces 42 are in engagement with the bearing surfaces 6 of the side frame columns.

Figure 4:
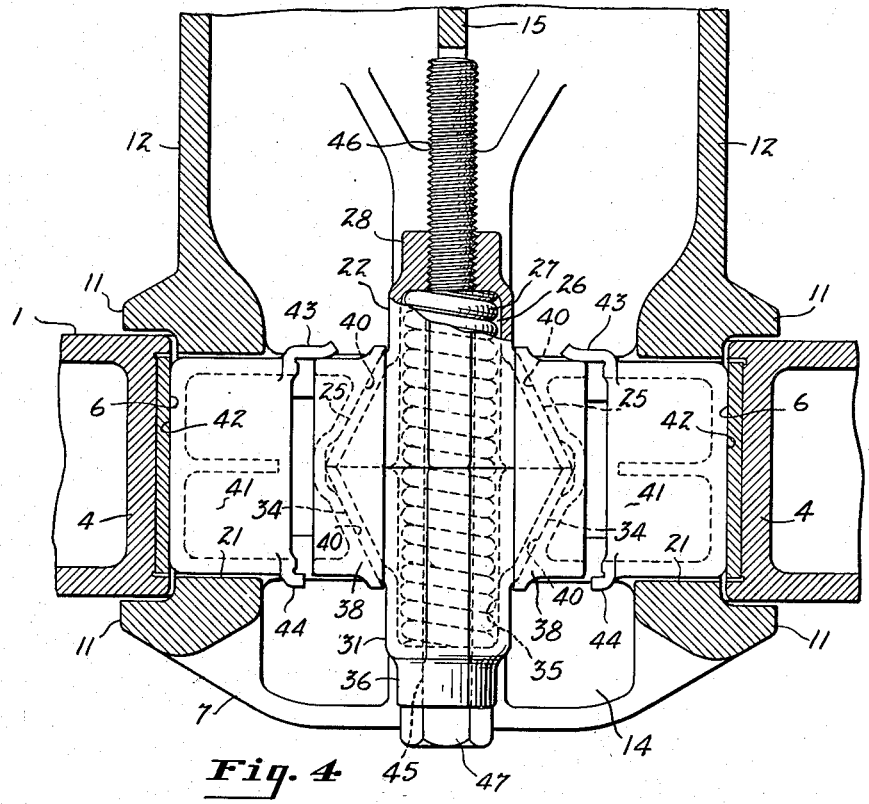
Fig. 4 is an enlarged fragmentary sectional view similar to Fig. 2 but illustrating the method by which a snubber can be readily installed or removed without disassembling the bolster and the side frame.
Figure 5:
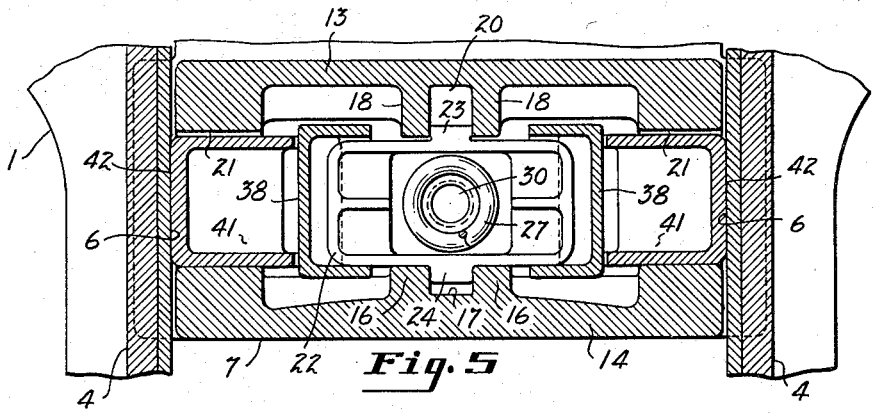
Fig. 5 is an enlarged sectional view of a snubbing device embodying the present invention, taken substantially on the line 5—5 of Fig. 3.

While Fig. 4 shows the installation bolt 45 as having a hexagonal head 47, it is to be understood that the bolt 45 could be provided with a crank handle to accomplish the rotation of the bolt for installation or removal of the snubbing mechanism.

Figure 6:
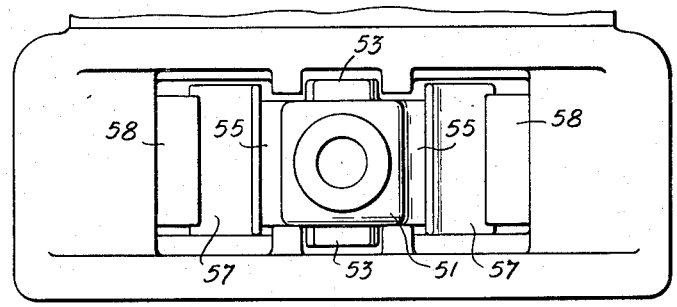
Fig. 6 is an enlarged elevational view of a modified form of the snubbing mechanism.
Figure 7:
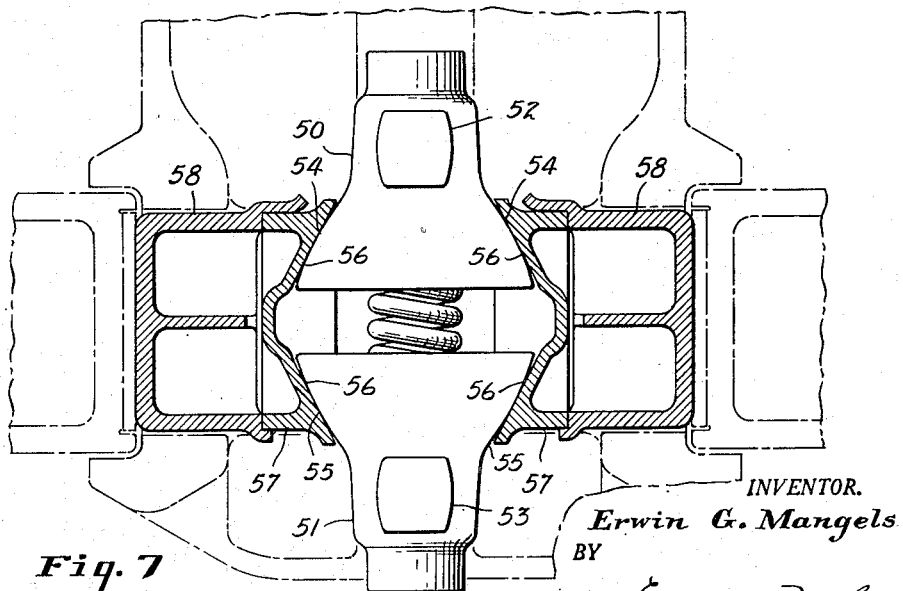
Fig. 7 is an enlarged plan view, with parts broken away, of the modified form of snubbing mechanism illustrated in Fig. 6.

Figs. 6 and 7 illustrate a modified form of the invention which differs from the form described in the Figs. 1 through 5 in two respects. The inner spring block 50 and the outer spring block 51 are provided with convexly faced keys 52 and 53 respectively rather than the ribs or keys 23 and 24 of the inner spring block 22 and ribs 32 and 33 of the outer spring block 31.

It is believed that these convexly faced keys provide centers of rotation which permit pivotal movement of the spring blocks 50 and 51 individually about the keys 52 and 53 respectively, in response to forces which would tend to shift the bolster toward one of the side frame columns, that is either to the right or to the left looking at Fig. 7. Such forces may be encountered when the car travels around a curve or during braking of the car. To cooperate and assist in the pivotal movement of the spring blocks, the wedge surfaces 54 of the spring block 50 and the wedge surfaces 55 of the outer spring block 51 may be rounded or arcuate in cross section so that in effect the spring blocks may rock on the wedge surfaces 56 of the wedge blocks 57 while rotating about their respective convexly faced keys 52 and 53.

In a car truck embodying this modified form of the invention, when the car brakes are applied the bolster and the car body which it supports tend to continue in motion due to inertia, while the side frame, in response to the application of the brakes, tends to oppose the above movement of the bolster, causing one of the side frame columns to exert greater pressure against the bolster than the other side frame column. This pressure is transmitted from the side frame column to one of the friction blocks 58 and through the wedge block 57 to the spring blocks 50 and 51. It may be that in response to this pressure the spring blocks 50 and 51 rotate slightly about their keys 52 and 53 respectively. Such rotation would tend to spread the spring blocks, thus causing the wedge blocks 57 to spread. This in turn would cause the friction block 58, opposite from the spring block where the pressure started, to move outwardly into greater frictional engagement with its adjacent side frame column. As a result, the temporary pressure between the bolster and one of the side frame columns is equalized and distributed to the other side frame column. A similar effect may be present when the car travels around a curve, in which case one end of the bolster may be pushing against a forward side frame column while the longitudinally opposite end of the bolster will press against a rear side frame column, and due to the action above described there is a tendency for the stabilizer mechanism of the present invention to equalize the pressures between the bolster and side frame columns at each of the ends of the bolster.

It may thus be seen that the snubbing mechanism of the present invention provides a friction snubber in which dampening action is equally applied to the side frame columns under all conditions. If a coil of the spring compressed between the spring blocks should be broken while the car is in service, the change in pressure exerted by the snubber mechanism is evenly distributed against the side frame columns. With snubbing mechanisms which employ a spring at each side of the bolster, a broken spring tends to move the bolster toward the side frame column on the side where the broken spring occurs which increases the wear between the bolster and side frame at this point as well as at the diagonally opposed bolster and side frame engagement on the opposite side of the car. In the present invention if the spring should be broken during service its only effect is to reduce the frictional engagement between the friction blocks and the side frame columns and no harmful results to the bolster, side frame or snubber mechanism parts can occur.

By providing a snubbing mechanism which can be installed or removed without disassembling the bolster from the side frame, cars provided with the present invention may be inspected or repaired while standing in the yards. It is only necessary for the maintenance man to carry an installation bolt to compress the spring blocks to remove the snubbing mechanisms and inspect its parts or to make replacements when necessary.

It will be noted that the friction blocks 41 are provided with a slight clearance at the top, bottom and sides between the friction blocks and the apertures 21 in the side walls 12 of the bolster. This clearance is provided to take care of high frequency vibration which may occur particularly in high speed freight movements. The friction blocks 41 will remain in constant engagement with the side frame columns while the bolster is free to have slight vertical and horizontal movements with respect to the friction blocks and the side frame.

It will be understood that the foregoing description is not intended to limit the scope of the present invention.

What I claim is:

1. In a car truck, a side frame having bearing surfaces defining a bolster opening, an open ended bolster resiliently supported on said side frame and received in said opening, means for holding said bolster with respect to said side frame so that said bolster may have only limited longitudinal movement, friction blocks insertable through the open end of said bolster positioned within lateral apertures in the bolster and having friction surfaces to contact the bearing surfaces of the side frame, means carried by said bolster for actuating said friction blocks into substantially equal frictional engagement with the bearing surfaces of said side frame, said means being insertable through the open end of said bolster and comprising a spring block having wedge surfaces lying in two planes disposed angularly with respect to said bearing surfaces, an opposite spring block having wedge surfaces lying in planes disposed angularly with respect to said bearing surfaces, wedge blocks each having wedge surfaces on one side in juxtaposition to and coacting with a wedge surface of each of said spring blocks and having their opposite sides adjacent and in engagement with said friction blocks, and resilient means interposed between said spring blocks to actuate said friction blocks into frictional engagement with said bearing surfaces.

2. In a car truck, a side frame having columns defining a bolster opening, bearing faces on said columns, an open ended bolster resiliently supported on said side frame and received in said opening, with lateral portions of said bolster extending outwardly beyond the faces of said columns to guide the bolster during vertical movement thereof and to prevent disassociation of the bolster and the side frame, said bolster having lateral apertures, frictional means to dampen movement of said bolster with respect to the side frame, said frictional means being insertable through the open end of said bolster and comprising opposed spring blocks each of which has a wedge surface directed toward each column of said side frame, follower blocks supported on the bolster for movements laterally thereof, said follower blocks having diverging wedge surfaces positioned, one on each side of said spring blocks, each follower block being between said spring blocks and one of said columns, said diverging wedge surfaces of each follower block engaging a wedge surface on each of said spring blocks, friction members actuated by said follower blocks through said lateral apertures in said bolster and disposed in frictional engagement with said bearing faces on said columns, and resilient means interposed between said opposed spring blocks to maintain engagement between said wedge surfaces and to transmit pressure through said surfaces to said friction members.

3. In a car truck, a side frame having columns defining a bolster opening, bearing faces on said columns, an open ended bolster resiliently supported on said side frame and received in said opening, with lateral portions of said bolster extending outwardly beyond the faces of said columns to guide the bolster during vertical movement thereof and to prevent disassociation of the bolster and the side frame, frictional means to dampen movement of said bolster with respect to the side frame, said frictional means being insertable through the open end of said bolster and comprising opposed spring blocks supported within said bolster and guided for movement longitudinally thereof, each of said spring blocks having wedge surfaces which diverge toward the other of said spring blocks and toward the bearing faces on said columns, follower blocks disposed on each side of said spring blocks between said columns and said spring blocks and having diverging wedge surfaces engaging one wedge surface of each wedge block, said follower blocks being movable laterally of the bolster, friction blocks between said follower blocks and said columns extending through lateral apertures in said bolster and having friction surfaces in engagement with the bearing faces of said columns, and resilient actuating means interposed between said opposed wedge blocks for maintaining said wedge surfaces in engagement and pressing said friction blocks toward said bearing faces.

4. In a car truck, a side frame having columns defining a bolster opening, bearing faces on said columns, an open ended bolster resiliently supported on said side frame and received in said opening, with lateral portions of said bolster extending outwardly beyond the faces of said columns to guide the bolster during vertical movement thereof and to prevent disassociation of the bolster and the side frame, said bolster having lateral apertures, frictional means to dampen movement of said bolster with respect to the side frame, said frictional means being insertable through the open end of said bolster and comprising opposed spring blocks supported on said bolster and having portions which slide in longitudinal channels of said bolster, each of said spring blocks having a wedge surface directed toward each column of said side frame, follower blocks supported on the bolster for movements laterally thereof and having diverging wedge surfaces on each side of said spring blocks between said spring blocks and said columns, said diverging wedge surfaces of each follower block engaging a wedge surface on each of said spring blocks, friction blocks actuated by said follower blocks through said lateral apertures in said bolster and disposed in frictional engagement with said bearing faces on said columns, and resilient actuating means interposed between said opposed wedge blocks for maintaining said wedge surfaces in engagement and pressing said friction blocks against said bearing faces.

5. In a car truck, a side frame having columns defining a bolster opening, bearing faces on said columns, an open ended bolster resiliently supported on said side frame and received in said opening, with lateral portions of said bolster extending outwardly beyond the faces of said columns to guide the bolster during vertical movement thereof and to prevent disassociation of the bolster and the side frame, said bolster having lateral apertures opening to said bearing faces, frictional means to dampen movement of said bolster with respect to the side frame, said frictional means being insertable through the open end of said bolster and comprising opposed spring blocks supported on said bolster and having convexly faced key portions which slide in longitudinal channels of said bolster, each of said spring blocks having an arcuate wedge surface directed toward each column of said side frame, follower blocks supported on the bolster for movements laterally thereof and having diverging wedge surfaces on each side of said wedge blocks between said wedge blocks and said columns, said diverging wedge surfaces of each follower block engaging an arcuate wedge surface on each of said wedge blocks, friction blocks actuated by said follower blocks guided in said lateral apertures in said bolster, said friction blocks being disposed in frictional engagement with said bearing faces on said columns, and resilient actuating means interposed between said opposed wedge blocks for maintaining said wedge surfaces in engagement and pressing said friction blocks against said bearing faces.

6. In a car truck, a side frame having columns defining a bolster opening, bearing surfaces on said columns, an open ended bolster resiliently supported on said side frame received in said opening and having portions interfitting with portions of said columns to prevent disassociation of said bolster and said side frame, apertures in the lateral ends of said bolster adjacent said bearing surfaces, friction blocks insertable through the open end of said bolster and received in said apertures, said friction blocks having friction surfaces for engagement with said bearing surfaces to dampen movement of said bolster with respect to the side frame, means to actuate said friction blocks equally, said means being insertable through the open end of said bolster and comprising opposed spring blocks supported on said bolster and having portions which interfit with portions of said bolster to guide the blocks for movement longitudinally of the bolster, each of said spring blocks having a vertical wedge surface directed toward each column of said side frame, follower blocks supported on said bolster for movements laterally thereof and disposed on each side of said spring blocks between the spring blocks and said friction blocks, diverging wedge surfaces on each of said follower blocks, the wedge surfaces of each follower block engaging a wedge surface on each of said spring blocks, and a horizontally disposed compression spring interposed between said spring blocks to spread said spring blocks apart and press the wedge surfaces thereof against the wedge surfaces of the follower blocks.

7. In a car truck, a side frame having a bolster opening with opposed upright bearing surfaces, a bolster having an end portion received in said opening, said end portion having a side wall in juxtaposition to each of said bearing surfaces and provided with an aperture, friction units mounted for lateral movement in said apertures and having outer friction surfaces for engagement with said bearing surfaces, each of said units having a pair of diverging wedge surfaces forming a reentrant inner face, a pair of relatively movable spring blocks retained between said reentrant faces, each spring block having wedge surfaces angularly disposed and engageable with a wedge surface of each of the friction units, and resilient means acting to spread said spring blocks and maintain pressure on said wedge surfaces to press said friction units toward said bearing surfaces.

8. A device as set forth in claim 7 in which the said bolster is provided with channel portions in which said spring blocks are guided for movement longitudinally of said bolster.

ERWIN G. MANGELS.

REFERENCES CITED

The following references are of record in the file of this patent:

UNITED STATES PATENTS

| Number | Name | Date |
|---|---|---|
| 2,365,198 | Lehrman | Dec. 19, 1944 |